Sheet 1 - 2 Sheets.

E. Bigelow,

Soda-Water Apparatus,

No. 2,711. Reissued Aug. 6, 1867.

Witnesses,
Danl. Read.
H. W. Smith

Inventor
Emanuel Bigelow

N. PETERS, PHOTO-LITHOGRAPHER, WASHINGTON, D. C.

Sheet 2-2 Sheets

E. Bigelow,

Soda-Water Apparatus,

No. 2,711. Reissued Aug. 6, 1867.

Witnesses.
David Read.
H. S. Smith

Inventor:
Edmund Bigelow

N. PETERS, PHOTO-LITHOGRAPHER, WASHINGTON, D. C.

United States Patent Office.

EDMUND BIGELOW, OF SPRINGFIELD, MASSACHUSETTS.

*Letters Patent No.* 22,697, *dated January* 25, 1859; *reissue No.* 2,711 *dated August* 6, 1867.

IMPROVED SODA-WATER APPARATUS.

The Schedule referred to in these Letters Patent and making part of the same.

Be it known that I, EDMUND BIGELOW, of Springfield, in the county of Hampden, and State of Massachusetts, have invented a new and useful improved Soda-Water Apparatus, applicable to all mineral waters, and other beverages to be used with sirups; and I do hereby declare and ascertain my said improvements as follows, referring to the accompanying drawing, in which—

Figure 4 is a section of the measuring-valve.

The purpose of this invention is to economize ice, by combining with an ice-reservoir, placed on a counter, or other convenient stand for drawing mineral water or other beverage, a conduit or pipe, through which said liquids are drawn, and a sirup-can or cans, by which said liquids are flavored. Also, to economize sirup and effectually measure the same by thoroughly ventilating the measuring faucet affixed to said cans.

Figure 1:
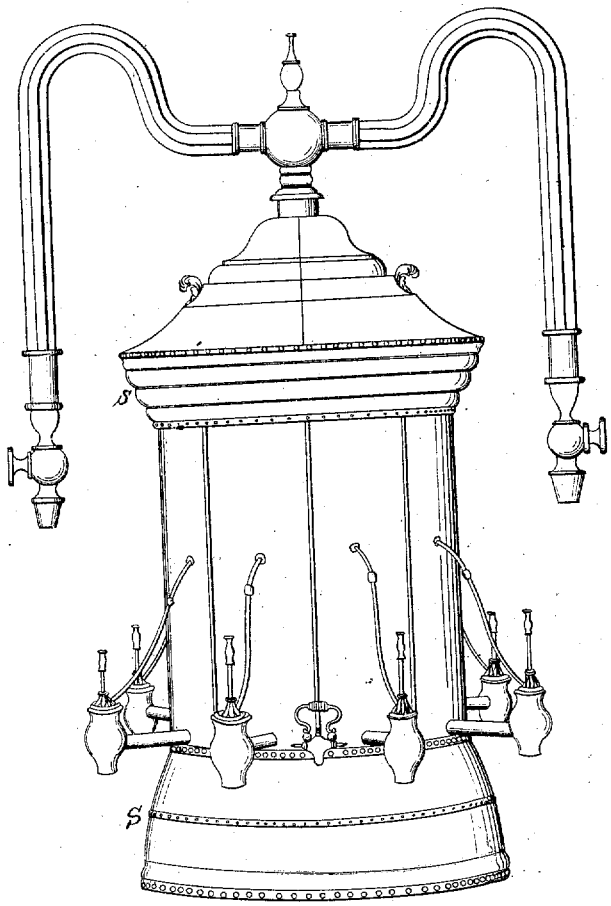
Figure 1 represents a general view of one form of my improvement.
Figure 3:
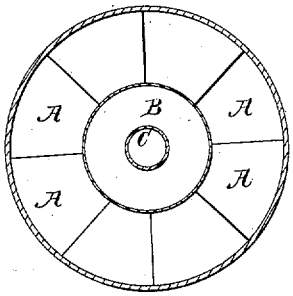
Figure 3 is a vertical section through the apparatus.
Figure 2:
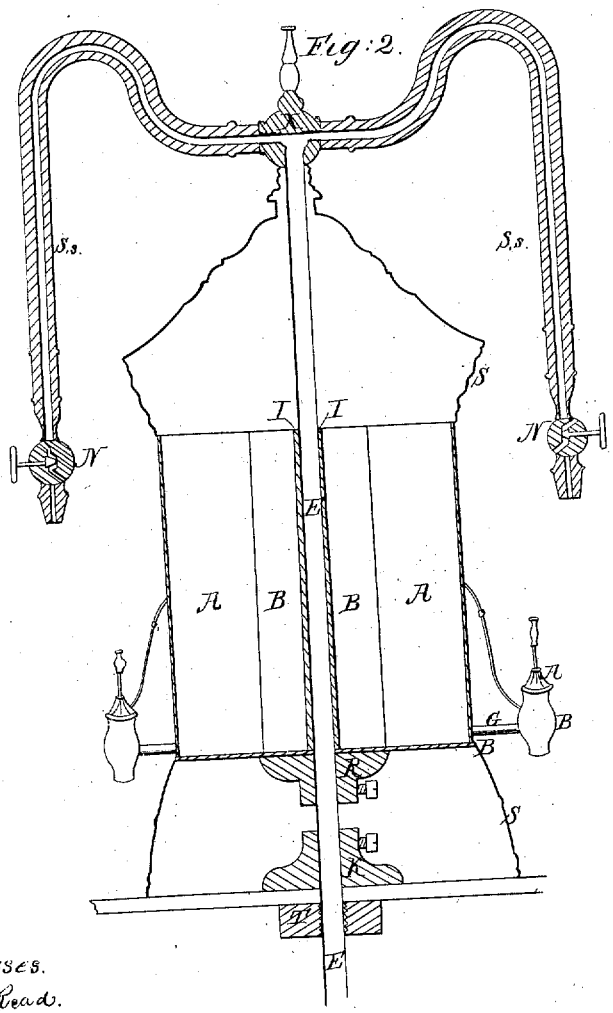
Figure 2 is a diagram or horizontal section, showing the sirup-cans surrounding an ice-chamber in which the conduit, through which the soda, &c., is drawn, is kept cool.
Figure 2:
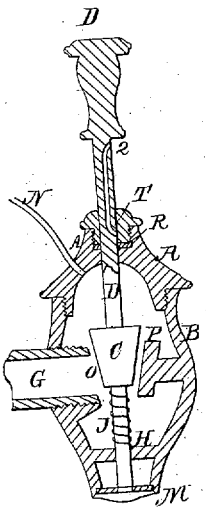

The construction of the apparatus is as follows: On a counter or stand, *a*, (see figs. 1 and 3,) I place a caster or reservoir, of any convenient form to suit the taste or convenience of the vendor. In the drawing is shown a circular caster, *b*, which may be made stationary or to revolve, as in my former patent of 6th April, 1858, and in this caster the sirup-cans *c* surround the ice-chamber, although, in other forms, it is obvious they might be placed in straight lines, their position being no part of my invention. To each of the sirup-cans, more or less in number, I attach a measuring faucet, (see fig. 4,) like that already patented by me in the patent aforesaid, with the addition of a vent or air-passage in the valve-stem *x*, and opening through the side or other part of the stem *x* at *y* and *z*, so as to admit air into the measuring-chamber when the discharge-valve is opened to discharge the contents of said measuring-chamber. This air-vent I have found, in practice, effective and important in rapidly discharging the measured sirup. In the drawing, *d* represents the centre shaft, around which the caster may revolve, and by which it is attached to the counter *a* by a nut and screw, as clearly seen in fig. 3. This shaft serves as the conduit for the passage of the mineral water, as seen in the drawing, although, in cases where the caster is stationary, it is obvious the conduit need not be in that position, so it passes through the ice-chamber to keep cool, which is the purpose of passing it through the ice-chamber. Above the caster or beyond the ice-reservoir the conduit branches off in arms *e e*, closed by stop-cocks in the usual way for drawing mineral waters.

Having thus fully described my improvements, what I claim as new, and for which I desire to secure Letters Patent, is—

First, the combination of the conduit through which the mineral waters are drawn, and the sirup-cans with the ice-reservoir, all in one stand or caster, substantially as and for the purpose described.

I also claim an air-vent in or connected with the valve-stem of a measuring faucet, as above set forth, or in any manner substantially the same.

I also claim, in combination with a sirup-caster, substantially as herein described, a measuring faucet, or its equivalent, so made that when the discharge-port is opened the supply-port is closed by proper plug or other formed valves, connected with a stem so constructed and arranged that it admits external air into the measuring chamber when the discharge-port is opened by the movement of said stem, all substantially in the manner and for the purposes herein set forth.

Witnesses:

WM. M. WILLIAMS,

FRANK H. ANDREWS.

EDMUND BIGELOW.